(12) United States Patent
Hua et al.

(10) Patent No.: US 10,924,892 B2
(45) Date of Patent: Feb. 16, 2021

(54) GROUP COMMUNICATIONS METHOD, DEVICE, AND SYSTEM

(71) Applicant: HUAWEI TECHNOLOGIES CO., LTD., Guangdong (CN)

(72) Inventors: Yao Hua, Shenzhen (CN); Yizhuang Wu, Beijing (CN); Yongqiang Gao, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 142 days.

(21) Appl. No.: 15/971,380

(22) Filed: May 4, 2018

(65) Prior Publication Data

US 2018/0255438 A1 Sep. 6, 2018

Related U.S. Application Data

(63) Continuation of application No. PCT/CN2015/093914, filed on Nov. 5, 2015.

(51) Int. Cl.
*H04W 4/08* (2009.01)
*H04W 4/46* (2018.01)
*H04J 11/00* (2006.01)
*H04W 84/04* (2009.01)

(52) U.S. Cl.
CPC .......... *H04W 4/08* (2013.01); *H04J 11/0079* (2013.01); *H04W 4/46* (2018.02); *H04J 2211/005* (2013.01); *H04W 84/045* (2013.01)

(58) Field of Classification Search
CPC .. H04W 56/0065; H04W 24/08; H04L 69/324
See application file for complete search history.

(56) References Cited

U.S. PATENT DOCUMENTS

2010/0035622 A1 2/2010 Ito et al.
2012/0236776 A1 9/2012 Zhang et al.
(Continued)

FOREIGN PATENT DOCUMENTS

CN 102740232 A 10/2012
CN 104284298 A 1/2015
(Continued)

*Primary Examiner* — Hassan Kizou
*Assistant Examiner* — Hector E Reyes Ortiz
(74) *Attorney, Agent, or Firm* — Womble Bond Dickinson (US) LLP

(57) ABSTRACT

Embodiments of the present invention relate to the communications field and provide a group communications method, device, and system to reduce a waste of an uplink resource and a downlink resource. The method may include obtaining, by a group communications server, group communication data to be sent by first user equipment and a cell identifier of a first cell, wherein the first cell provides a service for the first user equipment; obtaining, by the group communications server according to the cell identifier of the first cell, a group identifier of a first mobile group corresponding to the cell identifier of the first cell from a first preset correspondence; and sending, by the group communications server, the group communication data to a user equipment in the first mobile group other than the first user equipment according to the group identifier of the first mobile group.

10 Claims, 11 Drawing Sheets

(56) References Cited

U.S. PATENT DOCUMENTS

| | | | |
|---|---|---|---|
| 2012/0246244 A1* | 9/2012 | Mallet | G06Q 50/01 709/206 |
| 2014/0064177 A1* | 3/2014 | Anchan | H04W 4/08 370/312 |
| 2014/0177506 A1* | 6/2014 | Korus | H04W 4/06 370/312 |
| 2014/0341188 A1 | 11/2014 | Chang et al. | |
| 2015/0359023 A1* | 12/2015 | Stojanovski | H04W 72/02 370/329 |
| 2016/0050544 A1* | 2/2016 | Chandramouli | H04L 12/1845 370/312 |
| 2017/0273138 A1 | 9/2017 | Urabayashi et al. | |

FOREIGN PATENT DOCUMENTS

| | | |
|---|---|---|
| CN | 104754519 A | 7/2015 |
| JP | 2007-180880 A | 7/2007 |
| JP | 2009130558 A | 6/2009 |
| JP | 2010-041652 A | 2/2010 |
| WO | 2012137078 A2 | 10/2012 |
| WO | 2014046686 A1 | 3/2014 |
| WO | 2014158190 A1 | 10/2014 |
| WO | 2015014317 A1 | 2/2015 |
| WO | 2015038438 A1 | 3/2015 |
| WO | 2015/141844 A1 | 9/2015 |

\* cited by examiner

GROUP COMMUNICATIONS METHOD, DEVICE, AND SYSTEM

CROSS-REFERENCE TO RELATED APPLICATIONS

This application is a continuation of International Application No. PCT/CN 2015/093914, filed on Nov. 5, 2015, the disclosure of which is hereby incorporated by reference in its entirety.

TECHNICAL FIELD

Embodiments of the present invention relates to the communications field, and in particular, to a group communications method, device, and system.

BACKGROUND

As a new vehicle communications network, the Internet of Vehicles can implement wireless communication between vehicles and between a vehicle and roadside infrastructure. In the Internet of Vehicles, a vehicle A sends data of the vehicle A to a network-side device in a unicast manner by using a Long Term Evolution (LTE) network, and the network-side device delivers the data of the vehicle A to a vehicle around the vehicle A in a broadcast or multicast manner. In addition, when the vehicle A is located at an edge of a cell on which the vehicle A camps, the vehicle A is relatively close to a vehicle in the cell on which the vehicle A camps and is very close to a vehicle in a neighboring cell. In this case, the data of the vehicle A needs to be broadcast in the cell on which the vehicle A camps and needs to be broadcast in a cell that is relatively close to the vehicle A.

Currently, a technology closest to the foregoing data transmission is a Group Communication System Enablers (GCSE) technology of an LTE system. However, in the existing GCSE technology, user equipment included in each mobile group is changeless. In the Internet of Vehicles, the vehicle A expects to send data only to a vehicle around the vehicle A, and a mobile group that the vehicle A joins is always changing. That is, user equipment included in each mobile group in the Internet of Vehicles is not changeless.

To ensure that each vehicle on a road can receive a message of a vehicle around the vehicle, and receive only data of the vehicle around the vehicle, in the prior art, base stations around the road may be grouped into several mobile groups based on a neighboring cell merging rule. The vehicle A automatically joins one mobile group when driving into the mobile group, and after the vehicle A sends the data of the vehicle A, a Group Communication Service Application Server (GCS AS) broadcasts the data of the vehicle A in all cells of the mobile group. In this way, all vehicles at a given distance from the vehicle A can receive the data of the vehicle A, and further, the data of the vehicle A is not spread to a relatively remote cell. However, in this solution, there needs to be an overlapping coverage area between mobile groups, otherwise, the vehicle A can join only a mobile group of the current cell on which the vehicle A camps, but cannot receive data of a vehicle of a neighboring cell of the cell in which the vehicle A is located. When the vehicle A is located in an overlapping coverage area of a plurality of mobile groups, due to a limitation of a current protocol, the vehicle A cannot learn of a mobile group to which the vehicle A needs to send to-be-transmitted data in an uplink manner. Therefore, the vehicle A can only separately add a group identifier of each mobile group to which the vehicle A belongs to the to-be-transmitted data to perform uplink transmission, resulting in an uplink transmission resource waste. Further, the to-be-transmitted data of the vehicle A is also broadcast, in a downlink manner, in all cells of each mobile group to which the vehicle A belongs. This causes an unnecessary downlink resource waste.

SUMMARY

Embodiments of the present invention provide a group communications method, device, and system, so as to reduce a waste of an uplink resource and a downlink resource.

The following technical solutions are used in the embodiments of the present invention to achieve the foregoing objective.

An embodiment of the present invention provides a group communications method, applied to a group communications server and including:

obtaining, by the group communications server, group communication data to be sent by a first user equipment and a cell identifier of a first cell, wherein the first cell provides a service for the first user equipment;

obtaining, by the group communications server according to the cell identifier of the first cell, a group identifier of a first mobile group corresponding to the cell identifier of the first cell from a first preset correspondence, wherein the first preset correspondence is a correspondence between the cell identifier of the first cell and the group identifier of the first mobile group stored in a memory; and sending, by the group communications server, the group communication data to a second user equipment in the first mobile group other than the first user equipment according to the group identifier of the first mobile group.

In one embodiment, the group communications server maintains a first preset correspondence that stores a cell identifier of at least one cell and a group identifier of a primary mobile group to which each cell of the at least one cell belongs, wherein the cell identifier of the first cell is one of the cell identifier of the at least one cell, and the primary mobile group is a mobile group in which the group communications server communicates with a user equipment in the cell.

In one embodiment, the first user equipment arbitrarily selects a mobile group from mobile groups to which the first user equipment belongs, to send the group communication data in an uplink manner, so that the group communications server obtains the group communication data, thereby reducing an uplink resource waste. After obtaining the group communication data to be sent by the first user equipment and the cell identifier of the first cell, the group communications server obtains, according to the first preset correspondence and the cell identifier of the first cell, a set of cells to which the group communications server sends, in a downlink manner, the group communication data obtained by the group communications server, that is, obtains the group identifier of the first mobile group. In this way, the group communications server sends, to the user equipment in the first mobile group other than the first user equipment, the group communication data obtained by the group communications server, thereby reducing a waste of a resource used by the group communications server for sending the group communication data in a downlink manner.

In one embodiment, the obtaining, by a group communications server, group communication data to be sent by a first user equipment and a cell identifier of a first cell to which the first user equipment belongs includes:

receiving and parsing, by the group communications server, first group communication information sent by the first user equipment or a base station, where the first group communication information includes the group communication data and the cell identifier of the first cell, and the base station provides a service for the first user equipment.

In one embodiment, the group identifier of the first mobile group is a communication layer group identifier of the first mobile group, an application layer group identifier of the first mobile group, or an area identifier of the first mobile group.

An embodiment of the present invention provides a group communications method, applied to a user equipment, where the user equipment is the first user equipment, and the method includes:

obtaining, by the first user equipment, a first identifier, wherein the first identifier is a cell identifier of a first cell or a group identifier of a first mobile group, wherein the first cell serves the first user equipment, and the group communications server transmits group communication data with the first user equipment in only the first mobile group; and sending, by the first user equipment, the first identifier and to-be-sent group communication data to the group communications server.

When sending the to-be-sent group communication data to the group communications server, the first user equipment also adds the cell identifier of the first cell or the group identifier of the first mobile group. The first cell is a cell that provides a service for the first user equipment, and the group communications server transmits the group communication data with the first user equipment in only the first mobile group. Therefore, the first user equipment adds only the first identifier to send the to-be-sent group communication data, and no longer adds a group identifier of another mobile group to send the to-be-sent group communication data, thereby reducing an uplink resource waste. In addition, after receiving the group communication data and the first identifier that are sent by the first user equipment, the group communications server can determine, according to the first identifier, user equipment to which the group communication data is sent in a downlink manner, thereby reducing a downlink resource waste.

In one embodiment, the obtaining, by the first user equipment, a group identifier of a first mobile group includes:

obtaining, by the first user equipment, the cell identifier of the first cell in which the first user equipment is located; and obtaining, by the first user equipment according to the cell identifier of the first cell, the group identifier of the first mobile group corresponding to the cell identifier of the first cell from a second preset correspondence, where the second preset correspondence stores the cell identifier of the first cell and the group identifier of the first mobile group.

In one embodiment, the group identifier of the first mobile group is a communication layer group identifier of the first mobile group, an application layer group identifier of the first mobile group, or an area identifier of the first mobile group.

In one embodiment, the group identifier of the first mobile group is the application layer group identifier of the first mobile group; and the obtaining, by the first user equipment, the application layer group identifier of the first mobile group includes:

obtaining, by the first user equipment, the communication layer group identifier of the first mobile group; and obtaining, by the first user equipment according to the communication layer group identifier of the first mobile group, the application layer group identifier of the first mobile group corresponding to the communication layer group identifier of the first mobile group from a third preset correspondence, where the third preset correspondence stores the communication layer group identifier of the first mobile group and the application layer group identifier of the first mobile group.

The group identifier that is of the first mobile group and that is obtained by the first user equipment may be the application layer group identifier of the first mobile group or the communication layer group identifier of the first mobile group. When the group identifier that is of the first mobile group and that is obtained by the first user equipment is the communication layer group identifier of the first mobile group, the application layer group identifier of the first mobile group may be obtained by using the third preset correspondence that is of the first user equipment and that stores a communication layer group identifier of at least one mobile group and an application layer group identifier of each mobile group of the at least one mobile group. The third preset correspondence is configured on a network, and both the first user equipment and the group communications server can obtain the third preset correspondence.

In one embodiment, the obtaining, by the first user equipment, the communication layer group identifier of the first mobile group includes:

receiving, by the first user equipment, a first message broadcast by a base station, where the first message includes communication layer group identifiers of at least two mobile groups, the first mobile group is one of the at least two mobile groups, the communication layer group identifier of the first mobile group is placed in a preset location of the first message, and the base station provides a service for the first user equipment; and extracting, by the first user equipment, the communication layer group identifier of the first mobile group from the preset location of the first message.

In one embodiment, the obtaining, by the first user equipment, the communication layer group identifier of the first mobile group includes:

sending, by the first user equipment, a capability message to a base station, where the capability message includes at least attribute information, the attribute information is used to indicate that the first user equipment is user equipment on a group communications network, and the base station provides a service for the first user equipment;

receiving, by the first user equipment, a second message sent by the base station, where the second message includes at least the communication layer group identifier of the first mobile group; and extracting, by the first user equipment, the communication layer group identifier of the first mobile group from the second message.

There are a plurality of methods for obtaining the group identifier of the first mobile group by the first user equipment as described herein. In at least some embodiments, after obtaining the group identifier of the first mobile group, the first user equipment always adds the group identifier of the first mobile group to send the group communication data, and no longer adds a group identifier of another mobile group to send the group communication data in an uplink manner, thereby reducing a waste of a resource for sending the group communication data in an uplink manner.

An embodiment of the present invention provides a base station, where the base station provides a service for the foregoing first user equipment, and includes:

sending, by the base station, a communication layer group identifier of a first mobile group to the first user equipment, where a group communications server transmits group communication data with the first user equipment in only the first mobile group, and the base station provides a service for the first user equipment.

In one embodiment, the sending, by the base station, a communication layer group identifier of a first mobile group to the first user equipment includes:

broadcasting, by the base station, a first message, where the first message includes communication layer group identifiers of at least two mobile groups, the first mobile group is one of the at least two mobile groups, and the communication layer group identifier of the first mobile group is placed in a preset location of the first message.

In one embodiment, the sending, by the base station, a communication layer group identifier of a first mobile group to the first user equipment includes:

receiving, by the base station, a capability message sent by the first user equipment, where the capability message includes at least attribute information, and the attribute information is used to indicate that the first user equipment is user equipment on a group communications network;

determining, by the base station, the communication layer group identifier of the first mobile group according to the attribute information; and sending, by the base station, a second message to the first user equipment, where the second message includes at least the communication layer group identifier of the first mobile group.

An embodiment of the present invention provides a base station, where the base station provides a service for the foregoing first user equipment, and includes:

parsing, by the base station, second group communication information sent by the first user equipment, where the second group communication information includes a group communication service identifier and group communication data to be sent by the first user equipment, the group communication service identifier is used to represent that a network on which the first user equipment is located is a group communications network, and the base station provides a service for the first user equipment; and sending, by the base station, a cell identifier of a first cell to which the first user equipment belongs and the second group communication information to a group communications server according to the group communication service identifier.

The base station sends, to the group communications server, the cell identifier of the first cell to which the first user equipment belongs and the second group communication information sent by the first user equipment, so that a processing overhead when the first user equipment adds the cell identifier of the first cell when sending the group communication data to the group communications server is reduced.

An embodiment of the present invention provides a group communications server, including:

an obtaining unit, configured to obtain group communication data to be sent by a first user equipment and a cell identifier of a first cell, where the first cell provides a service for the first user equipment, and configured to obtain, according to the cell identifier of the first cell, a group identifier of a first mobile group corresponding to the cell identifier of the first cell from a first preset correspondence, wherein the first preset correspondence is a correspondence between the cell identifier of the first cell and the group identifier of the first mobile group stored in a memory; and a sending unit, configured to send the group communication data to user equipment in the first mobile group other than the first user equipment according to the group identifier that is of the first mobile group and that is obtained by the obtaining unit.

In one embodiment, the obtaining unit is configured to receive and parse first group communication information sent by the first user equipment or a base station, where the first group communication information includes the group communication data and the cell identifier of the first cell, and the base station provides a service for the first user equipment.

An embodiment of the present invention provides user equipment, where the user equipment is the first user equipment and includes:

an obtaining unit, configured to obtain a first identifier, where the first identifier is a cell identifier of a first cell or a group identifier of a first mobile group, the first cell serves the user equipment, and the group communications server transmits group communication data with the user equipment in only the first mobile group; and a sending unit, configured to send the first identifier obtained by the obtaining unit and to-be-sent group communication data to the group communications server.

In one embodiment, the obtaining unit is configured to:

obtain the cell identifier of the first cell in which the user equipment is located; and obtain, according to the cell identifier of the first cell, the group identifier of the first mobile group corresponding to the cell identifier of the first cell from a second preset correspondence, where the second preset correspondence stores the cell identifier of the first cell and the group identifier of the first mobile group.

In one embodiment, the group identifier of the first mobile group is a communication layer group identifier of the first mobile group, an application layer group identifier of the first mobile group, or an area identifier of the first mobile group.

In one embodiment, the group identifier of the first mobile group is the application layer group identifier of the first mobile group; and the obtaining unit is configured to:

obtain the communication layer group identifier of the first mobile group; and obtain, according to the communication layer group identifier of the first mobile group, the application layer group identifier of the first mobile group corresponding to the communication layer group identifier of the first mobile group from a third preset correspondence, where the third preset correspondence stores the communication layer group identifier of the first mobile group and the application layer group identifier of the first mobile group.

In one embodiment, the group identifier of the first mobile group is the application layer group identifier of the first mobile group, and the user equipment further includes a receiving unit, where the receiving unit is configured to receive a first message broadcast by a base station, where the first message includes communication layer group identifiers of at least two mobile groups, the first mobile group is one of the at least two mobile groups, the communication layer group identifier of the first mobile group is placed in a preset location of the first message, and the base station provides a service for the user equipment; and the obtaining unit includes an extraction subunit, where the extraction subunit is configured to extract the communication layer group identifier of the first mobile group from the preset location of the first message received by the receiving unit.

In one embodiment, the group identifier of the first mobile group is the application layer group identifier of the first mobile group;

the sending unit is configured to send a capability message to a base station, where the capability message includes at least attribute information, the attribute information is used to indicate that the user equipment is user equipment on a group communications network, and the base station provides a service for the user equipment;

the user equipment further includes a receiving unit, where the receiving unit is configured to receive a second message sent by the base station, where the second message includes at least the communication layer group identifier of the first mobile group; and the obtaining unit includes an extraction subunit, where the extraction subunit is configured to extract the communication layer group identifier of the first mobile group from the second message received by the receiving unit.

An embodiment of the present invention provides a base station, including:

a sending unit, configured to send a communication layer group identifier of a first mobile group to first user equipment, where a group communications server transmits group communication data with the first user equipment in only the first mobile group, and the base station provides a service for the first user equipment.

In one embodiment, the sending unit is configured to broadcast a first message, where the first message includes communication layer group identifiers of at least two mobile groups, the first mobile group is one of the at least two mobile groups, and the communication layer group identifier of the first mobile group is placed in a preset location of the first message.

In one embodiment, the base station further includes a receiving unit, where the receiving unit is configured to receive a capability message sent by the first user equipment, where the capability message includes at least attribute information, and the attribute information is used to indicate that the first user equipment is user equipment on a group communications network;

the base station further includes a determining unit, where the determining unit is configured to determine the communication layer group identifier of the first mobile group according to the attribute information received by the receiving unit; and the sending unit is configured to send a second message to the first user equipment, where the second message includes at least the communication layer group identifier that is of the first mobile group and that is determined by the determining unit.

An embodiment of the present invention provides a base station, including:

a parsing unit, configured to parse second group communication information sent by first user equipment, where the second group communication information includes a group communication service identifier and group communication data to be sent by the first user equipment, the group communication service identifier is used to represent that a network on which the first user equipment is located is a group communications network, and the base station provides a service for the first user equipment; and a sending unit, configured to send a cell identifier of a first cell to which the first user equipment belongs and the second group communication information to a group communications server according to the group communication service identifier obtained by the parsing unit.

For a technical effect of the base station provided in this embodiment of the present invention, refer to the technical effect of the base station described in the group communications method executed by the base station in the foregoing fourth aspect, and details are not described herein again.

An embodiment of the present invention provides a group communications server, including an interface circuit, a processor, a memory, and a system bus, where the memory is configured to store a first preset correspondence and a third preset correspondence; the interface circuit, the processor, and the memory are connected to the system bus; and when the group communications server is running, the group communications server executes the group communications method as described herein.

An embodiment of the present invention provides user equipment, including an interface circuit, a processor, a memory, and a system bus, where the memory is configured to store a computer executable instruction and a second preset correspondence; the interface circuit, the processor, and the memory are connected to the system bus; and when the user equipment is running, the user equipment executes the group communications method as described herein.

An embodiment of the present invention provides a base station, including an interface circuit, a processor, a memory, and a system bus, where the memory is configured to store a computer executable instruction; the interface circuit, the processor, and the memory are connected to the system bus; and when the base station is running, the user equipment executes the group communications method as described herein.

An embodiment of the present invention provides a group communications system, including the group communications server, the user equipment, and the base stations described herein.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention.

DESCRIPTION OF EMBODIMENTS

Figure 1:
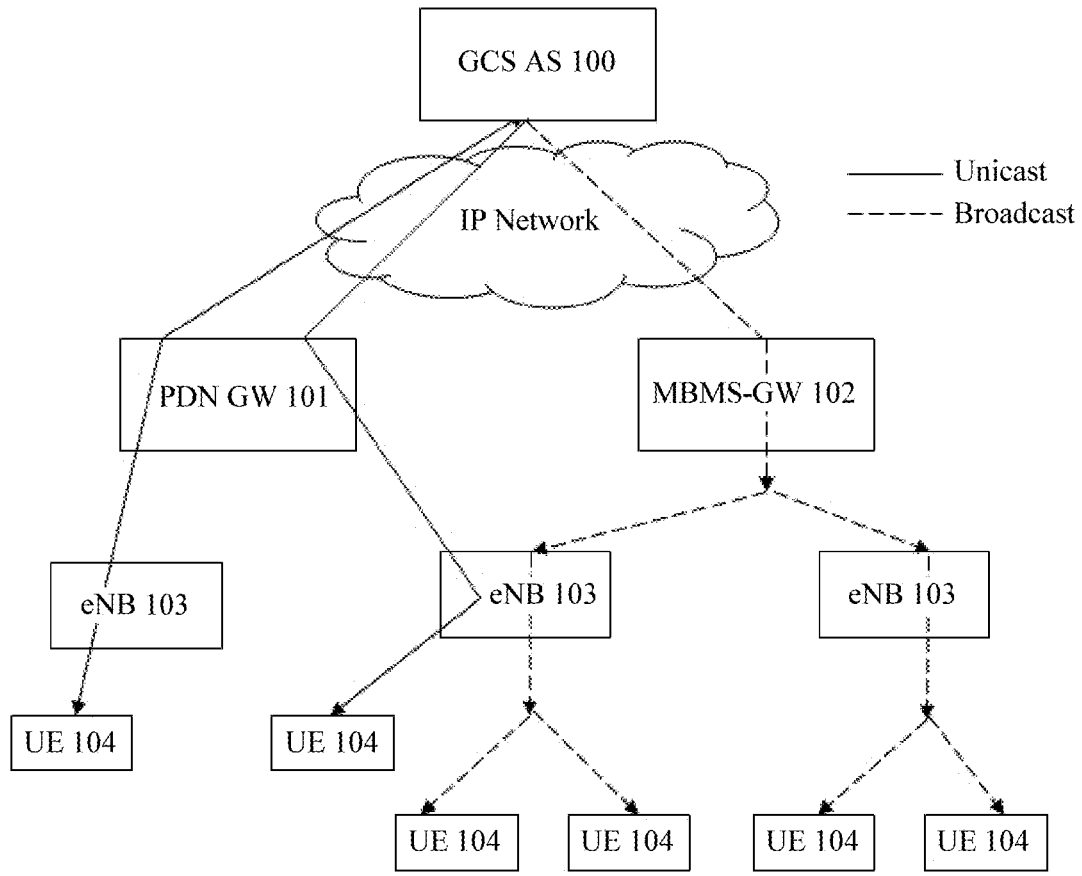
FIG. 1 is a diagram of a network structure of a group communications system in an LTE system architecture.

The following clearly describes the technical solutions in the embodiments of the present invention with reference to the accompanying drawings in the embodiments of the present invention. Apparently, the described embodiments are merely some but not all of the embodiments of the present invention.

In the following description, specific details such as a particular system structure, an interface, and a technology are set forth in an illustrative but not a restrictive sense to make a thorough understanding embodiments of the present invention. However, a person of ordinary skill in the art should know that embodiments of the present invention may be practiced in other embodiments without these specific details. In other cases, detailed descriptions of well-known mobile devices, circuits, and methods are omitted, so that embodiments of the present invention is described without being obscured by unnecessary details.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The ordinal numbers such as "first" and "second" mentioned in the embodiments of the present invention shall only serve the purpose of differentiation unless the numbers definitely indicate a sequence according to the context.

Technologies described in this specification may be used for various radio network systems including a group communications server, for example, a GSM (Global System for Mobile Communications), a CDMA (Code Division Multiple Access) 2000 system, a Wideband Code Division Multiple Access (WCDMA), a Long Term Evolution (LTE) system, and another communications system of this type.

User equipment is a wireless terminal. The wireless terminal may be a device providing a user with speech and/or data connectivity, a handheld device with a wireless connection function, or another processing device connected to a wireless modem. The wireless terminal may communicate with one or more core networks through a radio access network (such as a RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. The wireless terminal may also be referred to as a system, a subscriber unit, a subscriber station, a mobile station, a mobile station (Mobile), a remote station, an access point, a remote terminal, an access terminal, a user terminal, a user agent, or user equipment.

A GCSE technology of an LTE system is a technology that introduces a function of an application layer to the 3GPP (3rd Generation Partnership Project) to support group communication. User equipments of the LTE system are grouped into different mobile groups, and one user equipment may belong to one mobile group or a plurality of different mobile groups.

FIG. 1 is a diagram of a network structure of a group communications system in an LTE system architecture. Referring to FIG. 1, the network system includes a Group Communication Service Application Server (GCS AS) 100, a Packet Data Network Gateway (PDN GW) 101, a Multimedia Broadcast Multicast Service Gateway (MBMS-GW) 102, an evolved NodeB (eNB) 103, and User Equipment (UE) 104. The GCS AS 100 is connected to the PDN GW 101 via a network, and the GCS AS 100 is connected to the MBMS-GW 102 via a network. The GCS AS 100 may perform service transmission by using an LTE unicast evolved packet system bearer, or broadcast a group communication service by using an existing MBMS network. In FIG. 1, solid lines indicate that the GCS AS 100 performs service transmission by using the LTE unicast evolved packet system bearer, and dotted lines indicate that the GCS AS 100 broadcasts a group communication service by using the existing MBMS network.

Figure 2:
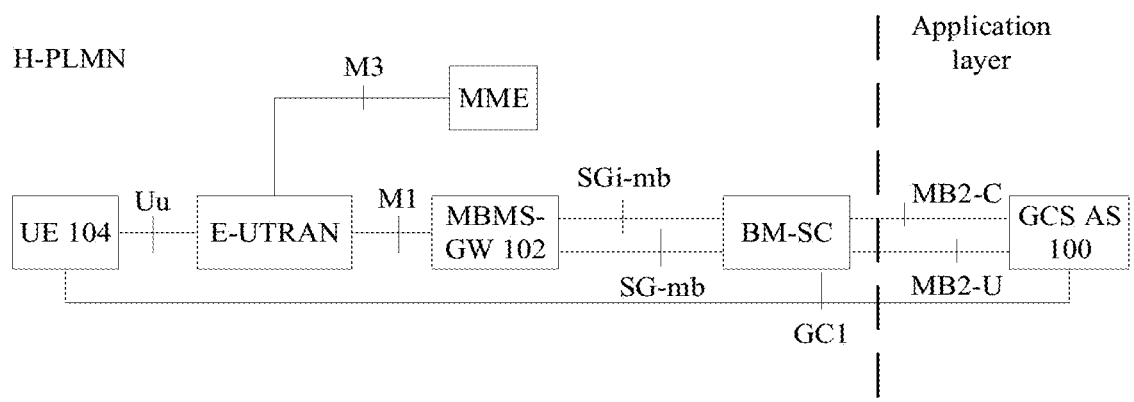
FIG. 2 is a schematic diagram of a structural composition of a group communications system in an LTE system architecture.

FIG. 2 is a schematic diagram of a structural composition of a group communications system in an LTE system architecture. An Evolved UMTS Terrestrial Radio Access Network (E-UTRAN) is a radio access network, and includes an eNB 103 that provides an access radio network interface for UE 104. A Broadcast-Multicast Service Centre (BM-SC) is a service layer network element, provides convergence and transmission of a service, authorization of a user, establishment and initiation of an MBMS service bearer, initiation of session control, and the like, and may also implement synchronization between the BM-SC and the eNB 103. As a node between the BM-SC and the eNB 103, an MBMS-GW 102 is an access gateway of a network, and is responsible for processing a packet related to user data and session-related signaling. Uu, M1, M3, SGi, GC1, and MB2 each indicate an interface. The UE 104 establishes a connection to the GCS AS 100 through the GC1 interface of an application layer. Because the GC1 interface is an application layer interface, the GCS AS 100 only needs to know which mobile group received group communication data comes from. Therefore, when the GC1 interface is being developed, a packet includes only an application layer identifier of one mobile group, where the identifier is used to indicate which mobile group the group communication data belongs to, and the packet carries no other identifiers.

In the foregoing group communications system, in a downlink process, the GCS AS and the BM-SC pre-establish many broadcast sessions, and each broadcast session is corresponding to an application layer group identifier of one mobile group and a communication layer identifier of the mobile group. In this way, when the GCS AS parses out an application layer group identifier of a mobile group from group communication data received by the GCS AS, the GCS AS automatically sends the group communication data to a plurality of cells corresponding to a corresponding broadcast session.

Currently, the GCSE technology is mainly applied to a group communication service in which mobile groups are obtained by performing grouping based on users. For a group communication service in which mobile groups are obtained by performing grouping based on locations, there is an overlapping coverage area between mobile groups. When user equipment is in the overlapping coverage area between the mobile groups, due to a limitation of a current protocol, the user equipment cannot learn of a group identifier of a mobile group that needs to be carried when sending to-be-transmitted group communication data in an uplink manner. That is, the user equipment cannot learn of a mobile group to which the user equipment sends the to-be-transmitted group communication data in an uplink manner. Therefore, the user equipment can only add different mobile group identifiers to the to-be-transmitted group communication data and send the to-be-transmitted group communication data for a plurality of times, resulting in an uplink transmission resource waste. Further, the group communication data that is sent by the user equipment in an uplink manner is also broadcast, in a downlink manner, in all cells of each mobile group to which the user equipment belongs, resulting in a downlink resource waste.

Figure 3:
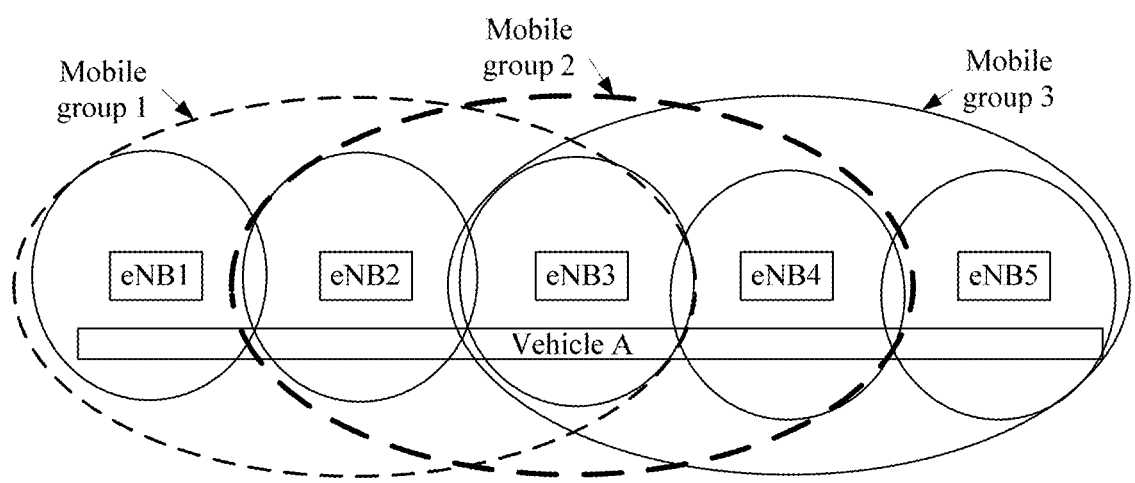
FIG. 3 is a schematic diagram of obtaining mobile groups by performing grouping based on geographic locations in the prior art.

As shown in FIG. 3, for five base stations along a road, an eNB1, an eNB2, and an eNB3 are grouped into a mobile group 1, the eNB2, the eNB3, and an eNB4 are grouped into a mobile group 2, and so on. After a vehicle A enters the mobile group 2 and sends data of the vehicle A in a cell 2 (a coverage area of the eNB2) in an uplink manner, a GCS AS broadcasts the data of the vehicle A in the cell 2, a cell 3, and a cell 4. When the vehicle A is in a coverage area of the eNB3, the vehicle A is in coverage areas of the mobile group 1, the mobile group 2, and a mobile group 3 at the same time. In this case, the vehicle A joins the mobile group 1, the mobile group 2, and the mobile group 3 at the same time. Due to a limitation of a current protocol, the vehicle A cannot learn of a mobile group to which the vehicle A needs to send to-be-transmitted data of the vehicle A in an uplink manner. Therefore, the vehicle A can only separately add a group identifier of the mobile group 1, a group identifier of the mobile group 2, or a group identifier of the mobile group 3 to the to-be-transmitted data of the vehicle A for uplink transmission, resulting in an uplink transmission resource waste. Further, the to-be-transmitted data of the vehicle A is also broadcast in all cells of each mobile group in a downlink manner. In this way, an unnecessary downlink resource waste is caused in some cells (such as the cell 1 and a cell 5).

The embodiments of the present invention provide a group communications method, device, and system. A group communications server itself maintains a first preset correspondence that stores a cell identifier of at least one cell and a group identifier of a primary mobile group to which each cell of the at least one cell belongs; or first user equipment itself maintains a third preset correspondence that stores a cell identifier of at least one cell and a group identifier of a primary mobile group to which each cell of the at least one cell belongs; or first user equipment performs signaling interaction with a base station to which the first user equipment belongs, so that the first user equipment sends group communication data in only one mobile group in an uplink manner, thereby reducing an uplink resource waste. In addition, an identifier that is of a primary mobile group of the first user equipment and that is obtained by the group communications server is a group identifier of a first mobile group, and the group communications server broadcasts the group communication data in the first mobile group according to the group identifier of the first mobile group, thereby reducing a waste of a resource used by the group communications server for sending the group communication data in a downlink manner.

It should be noted that the group communications method, device, and system provided in the embodiments of the present invention are applied to a group communications system similar to that shown in FIG. 1 and FIG. 2, and are applicable to a group communication service in which mobile groups are obtained by performing grouping based on geographic locations.

Embodiment 1

Figure 4:
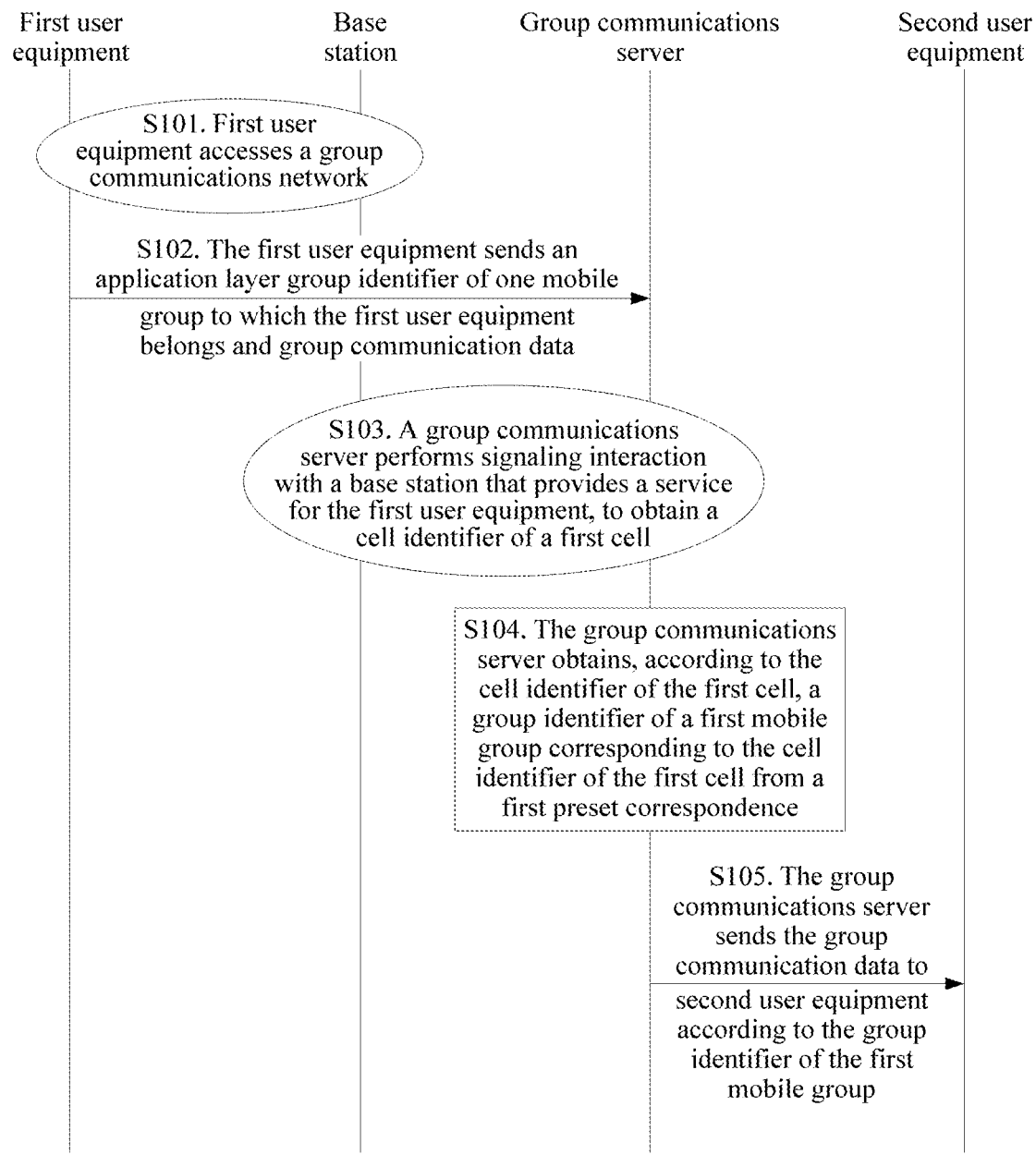
FIG. 4 is a first schematic flowchart of a group communications method according to an embodiment of the present invention.

As shown in FIG. 4, an embodiment of the present invention provides a group communications method, including the following operations.

S101. First user equipment accesses a group communications network.

The first user equipment may join a plurality of mobile groups according to a location of the first user equipment. Alternatively, only one mobile group may be configured on the entire group communications network, and the first user equipment joins the mobile group.

Specifically, a network bearer is established between the first user equipment and a base station that provides a service for the first user equipment.

S102. The first user equipment sends an application layer group identifier of one mobile group to which the first user equipment belongs and group communication data to a group communications server.

Specifically, the first user equipment arbitrarily selects one mobile group from mobile groups to which the first user equipment belongs, and sends, in an uplink manner in only the mobile group, the group communication data to be sent by the first user equipment. That is, the first user equipment sends the application layer group identifier of the selected mobile group and the group communication data to the group communications server.

Optionally, the group communications server in this embodiment of the present invention may be a GCS AS in an LTE system, or a V2V (Vehicle-to-Vehicle) application server in a V2V communications system. This is not specifically limited in this embodiment of the present invention.

A V2V communications technology is a technology in which vehicles on a V2V radio network transfer status information (such as a speed, a location, a driving direction, and braking) of the vehicles to each other.

S103. The group communications server performs signaling interaction with a base station that provides a service for the first user equipment, to obtain a cell identifier of a first cell.

The first cell provides a service for the first user equipment.

S104. The group communications server obtains, according to the cell identifier of the first cell, a group identifier of a first mobile group corresponding to the cell identifier of the first cell from a first preset correspondence.

The first preset correspondence stores a cell identifier of at least one cell and a group identifier of a primary mobile group to which each cell of the at least one cell belongs. The cell identifier of the first cell is one of the cell identifier of the at least one cell.

The primary mobile group in this embodiment of the present invention is a mobile group in which the group communications server communicates with user equipment, and the group communications server can send the group communication data only to user equipment in the primary mobile group in a downlink manner.

Optionally, a group identifier of a mobile group may be an application layer group identifier of the mobile group, or a communication layer group identifier of the mobile group, or an area identifier of the mobile group.

In an application scenario in which the user equipment joins at least two mobile groups, the group identifier of the mobile group in this embodiment of the present invention is the application layer group identifier of the mobile group or the communication layer group identifier of the mobile group. In an application scenario in which there is only one mobile group on the entire group communications network and the user equipment joins the mobile group, the group identifier of the mobile group in this embodiment of the present invention is the area identifier of the mobile group.

Therefore, the first preset correspondence maintained by the group communications server itself in this embodiment of the present invention may store a cell identifier of at least one cell and a communication layer group identifier of a primary mobile group to which each cell of the at least one cell belongs, or a cell identifier of at least one cell and an application layer group identifier of a primary mobile group to which each cell of the at least one cell belongs, or at least one cell and an area identifier of each cell of the at least one cell.

The area identifier in this embodiment of the present invention is used to indicate a cell set, and a plurality of cells of the cell set may belong to a plurality of operators.

Specifically, the group communications server can obtain, according to the cell identifier of the first cell, the group identifier of the first mobile group corresponding to the cell identifier of the first cell from the first preset correspondence. This indicates that the group communications server can send, only to user equipment in the first mobile group other than the first user equipment, the group communication data to be sent by the first user equipment.

S105. The group communications server sends the group communication data to second user equipment according to the group identifier of the first mobile group.

In this embodiment of the present invention, the second user equipment is used to indicate the user equipment in the first mobile group other than the first user equipment.

The group communications server itself maintains the first preset correspondence. Therefore, after obtaining the cell identifier of the first cell to which the first user equipment belongs, the group communications server can obtain, according to the first preset correspondence, the group identifier of the first mobile group corresponding to the cell identifier of the first cell. The first mobile group herein is a mobile group to which the first user equipment actually needs to send the group communication data in a downlink manner, and the group communications server sends the group communication data to the user equipment in the first mobile group other than the first user equipment in a downlink manner according to the group identifier of the first mobile group.

Specifically, the group communications server obtains the group identifier of the first mobile group according to the cell identifier of the first cell, and sends the group communication data to the user equipment in the first mobile group other than the first user equipment according to the group identifier of the first mobile group.

Specifically, if this embodiment of the present invention is applied to a GCSE technology, in a downlink process, a GCS AS and a BM-SC pre-establish many broadcast sessions, and each broadcast session is corresponding to an application layer group identifier of a mobile group and a communication layer identifier of the mobile group. Therefore, both the GCS AS and user equipment learn of a third preset correspondence in advance, that is, a correspondence between a communication layer group identifier of at least one mobile group and an application layer group identifier of each mobile group of the at least one mobile group.

In this way, when obtaining the application layer group identifier of the mobile group, the GCS AS can learn of the communication layer group identifier of the mobile group according to the third preset correspondence. Similarly, when obtaining the communication layer group identifier of the mobile group, the GCS AS can learn of the application layer group identifier of the mobile group according to the third preset correspondence.

Therefore, in this embodiment of the present invention, if the first preset correspondence maintained by the group communications server itself is a correspondence between a cell identifier of at least one cell and an application layer group identifier of a primary mobile group to which each cell of the at least one cell belongs, after obtaining the application layer group identifier of the first mobile group, the group communications server can also obtain the communication layer group identifier of the first mobile group according to the third preset correspondence.

Preferably, if the first user equipment joins a plurality of mobile groups in the operation S101, the communication layer group identifier of the mobile group in this embodiment of the present invention is a Temporary Mobile Group Identity (TMGI) in an existing enhanced Multimedia Broadcast/Multicast Service (eMBMS) system.

If only one mobile group is configured on the entire network in the operation S101, and the first user equipment joins the mobile group, the communication layer group identifier of the mobile group in this embodiment of the present invention is an area identifier. The area identifier is used to represent a set of cells to which the group communications server sends data in a downlink manner. It can be understood that, in this scenario, the first mobile group in this embodiment of the present invention may be regarded as the unique mobile group on the entire network. Therefore, the group communications server obtains the area identifier of the first mobile group and the group communication data to be sent by the first user equipment, and sends, in a downlink manner, the group communication data to all cells included in the area set represented by the area identifier of the first mobile group.

It should be noted that the foregoing area identifier is different from a flow ID in the current GCSE technology.

The flow ID is used to distinguish different broadcast server control areas in a same mobile group, and broadcast session areas corresponding to different flow IDs corresponding to a same mobile group are certainly not overlapping, and are certainly located in domination areas of different BM-SCs.

In the application scenario in this embodiment of the present invention, a same area identifier may be used in domination areas of different BM-SCs to broadcast a group communication service. The area identifier is to distinguish an area corresponding to a specific cell set from areas corresponding to a same mobile group. When the GCS AS and the BM-SC are establishing a broadcast session connection, a broadcast session is established by using the area identifier, the session is corresponding to a determined downlink broadcast/multicast cell list, and these cells may be located in domination areas of different BM-SCs.

In this embodiment of the present invention, the first user equipment arbitrarily selects a mobile group from mobile groups to which the first user equipment belongs, to send the group communication data in an uplink manner, thereby reducing an uplink resource waste. The first preset correspondence is pre-configured in the group communications server, so that after obtaining the cell identifier of the first cell in which the first user equipment is located, the group communications server can obtain, according to the first preset correspondence, the group identifier of the first mobile group to which the group communication data to be sent by the first user equipment needs to be broadcast in a downlink manner, so as to send, to user equipment in the first mobile group other than the first user equipment according to the group identifier of the first mobile group, the group communication data to be sent by the first user equipment, thereby reducing a downlink resource waste.

Embodiment 2

Figure 5:
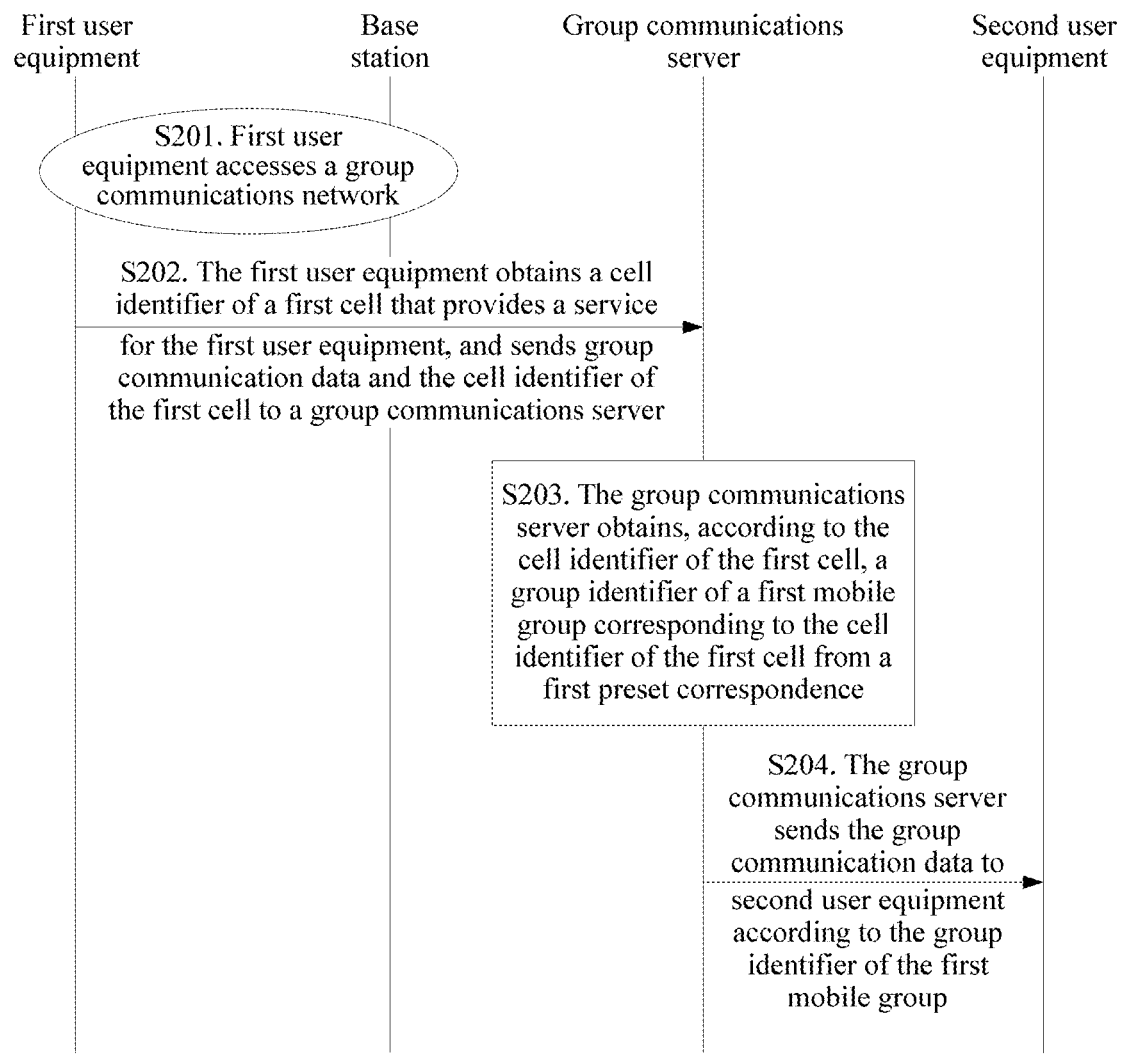
FIG. 5 is a second schematic flowchart of a group communications method according to an embodiment of the present invention.

As shown in FIG. 5, another embodiment of the present invention provides a group communications method, including the following operations.

S201. First user equipment accesses a group communications network.

S202. The first user equipment obtains a cell identifier of a first cell that provides a service for the first user equipment, and sends group communication data and the cell identifier of the first cell to a group communications server.

S203. After receiving the group communication data and the cell identifier of the first cell that are sent by the first user equipment, the group communications server obtains, according to the cell identifier of the first cell, a group identifier of a first mobile group corresponding to the cell identifier of the first cell from a first preset correspondence.

S204. The group communications server sends the group communication data to second user equipment according to the group identifier of the first mobile group.

S201 in this embodiment of the present invention is the same as S101 in the last embodiment, S203 is the same as S104 in the last embodiment, S204 is the same as S105 in Embodiment 1, and details are not described herein again.

A difference between this embodiment and the last embodiment is that, in this embodiment of the present invention, when sending the group communication data to the group communications server in S202, the first user equipment further sends the cell identifier of the first cell that provides a service for the first user equipment. In this way, the group communications server can directly obtain, according to information sent by the first user equipment, the cell identifier of the first cell that provides a service for the first user equipment, and the group communications server no longer needs to perform signaling interaction with a base station to which the first user equipment belongs, thereby reducing a signaling overhead when the group communications server obtains the cell identifier of the first cell to which the first user equipment belongs.

Embodiment 3

Figure 6:
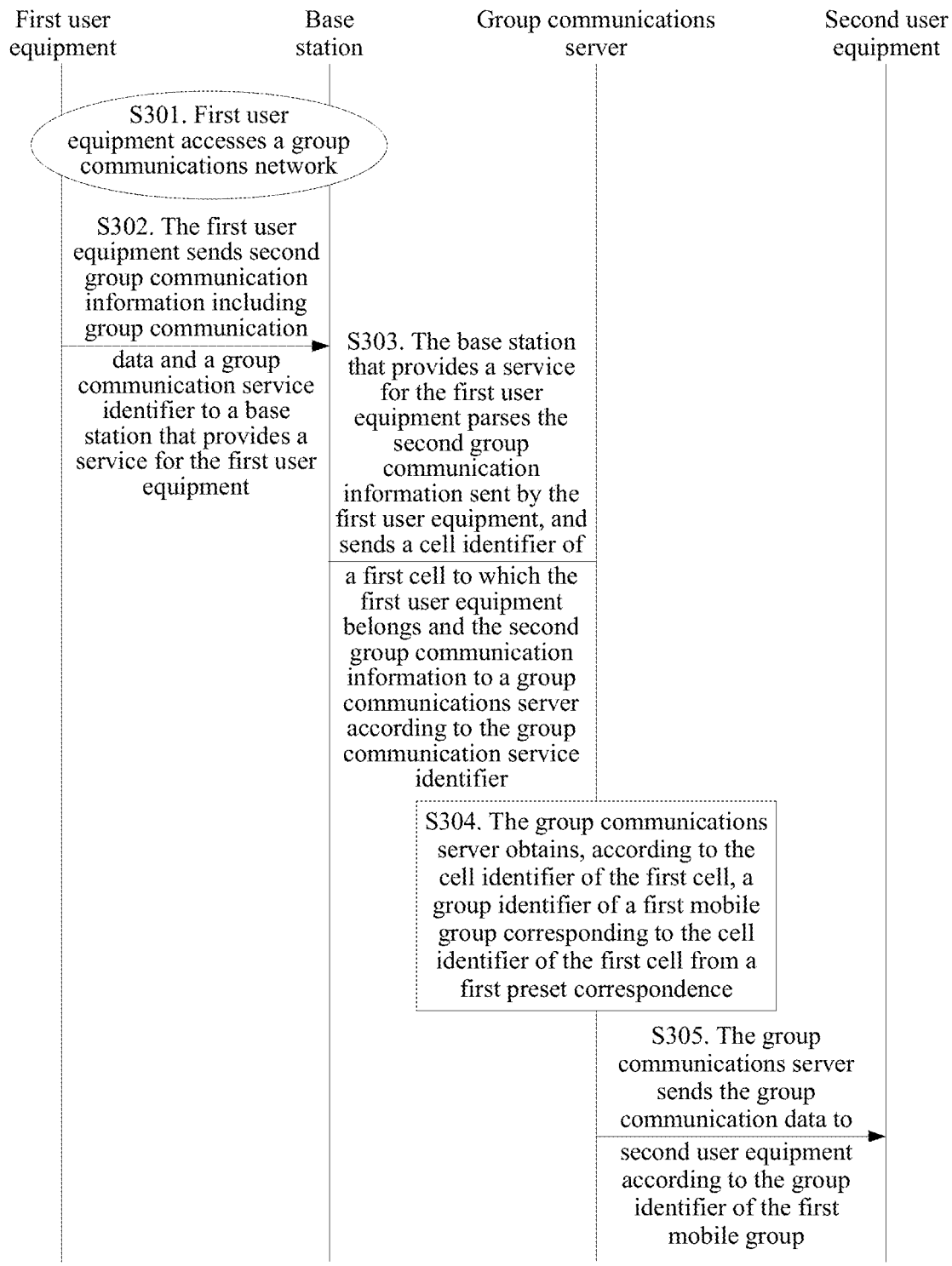
FIG. 6 is a third schematic flowchart of a group communications method according to an embodiment of the present invention.

As shown in FIG. 6, another embodiment of the present invention provides a group communications method, including the following operations.

S301. First user equipment accesses a group communications network.

S302. The first user equipment sends second group communication information including group communication data and a group communication service identifier to a base station that provides a service for the first user equipment.

S303. The base station that provides a service for the first user equipment parses the second group communication information sent by the first user equipment, and sends a cell identifier of a first cell to which the first user equipment belongs and the second group communication information to a group communications server according to the group communication service identifier.

S304. After receiving the cell identifier of the first cell and the second group communication information that are sent by the base station, the group communications server obtains, according to the cell identifier of the first cell, a group identifier of a first mobile group corresponding to the cell identifier of the first cell from a first preset correspondence.

S305. The group communications server sends the group communication data to second user equipment according to the group identifier of the first mobile group.

S301 in this embodiment of the present invention is the same as S101 in the foregoing embodiment, S304 is the same as S104 and S203 in the foregoing embodiments, S305 is the same as S105 and S204 in the foregoing embodiments, and details are not described herein again.

A difference between this embodiment and the foregoing embodiments is that, in this embodiment of the present invention, when the first user equipment sends the group communication data to the group communications server in S302, the first user equipment further sends the group communication service identifier. The group communication service identifier is used to represent that a network on which the first user equipment is located is a group communications network. In this way, the base station that provides a service for the first user equipment can learn, according to the group communication service identifier, that information sent by the first user equipment is group service data, so that the base station sends the cell identifier of the first cell to which the first user equipment belongs and the second communication information to the group communications server, that is, executes S303.

Compared with the last embodiment, the base station that provides a service for the first user equipment in this embodiment of the present invention sends the cell identifier of the first cell to which the first user equipment belongs to the group communications server, so that an overhead when the first user equipment further sends the cell identifier of the first cell when sending the group communication data in an uplink manner is reduced.

Embodiment 4

Figure 7:
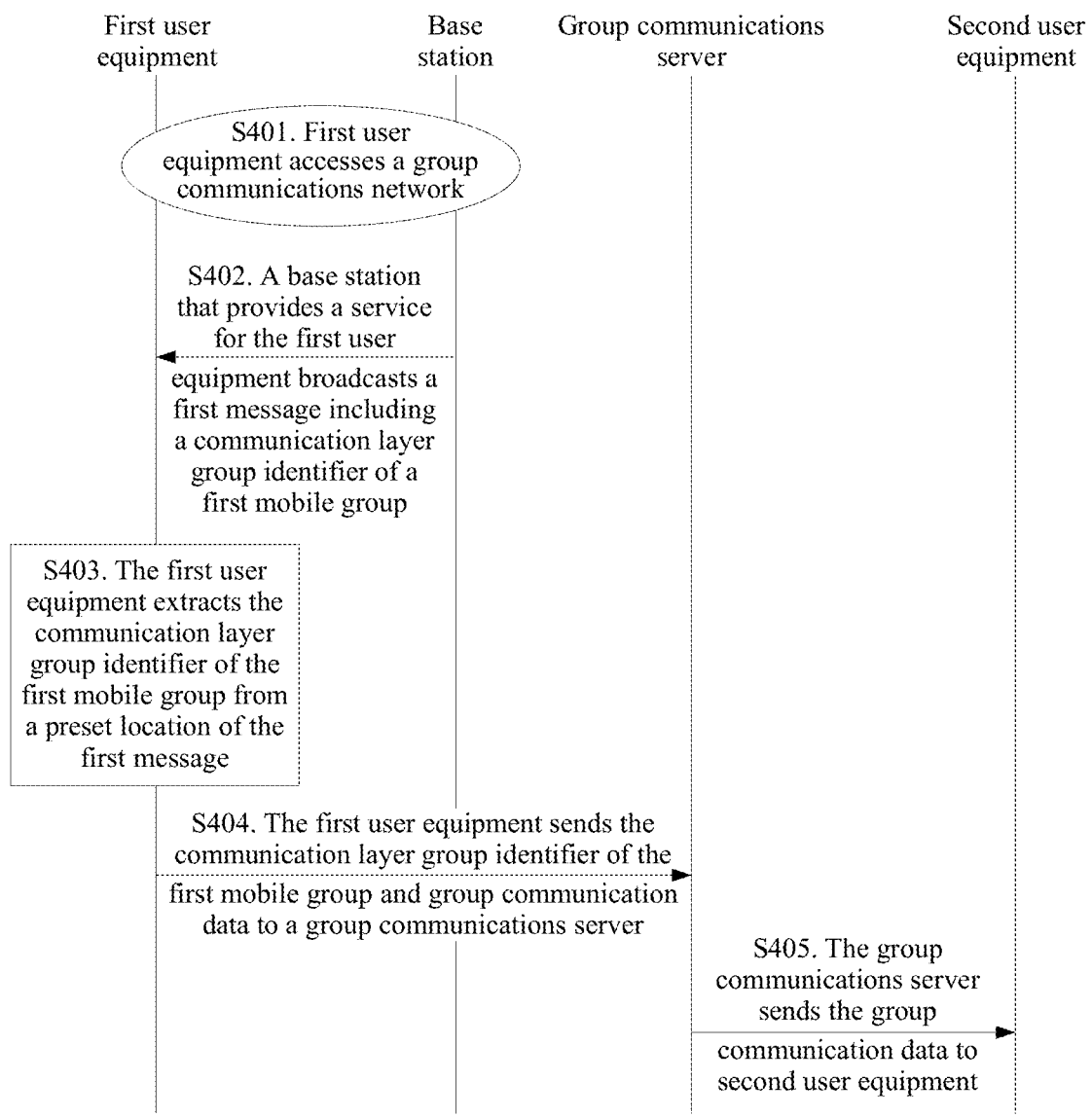
FIG. 7 is a fourth schematic flowchart of a group communications method according to an embodiment of the present invention.

As shown in FIG. 7, another embodiment of the present invention provides a group communications method, including the following operations.

S401. First user equipment accesses a group communications network.

S402. A base station that provides a service for the first user equipment broadcasts a first message including a communication layer group identifier of a first mobile group.

The first message includes communication layer group identifiers of at least two mobile groups, the first mobile group is one of the at least two mobile groups, the communication layer group identifier of the first mobile group is placed in a preset location of the first message, and the first user equipment adds only a group identifier of the first mobile group to send group communication data to be sent by the first user equipment.

S403. The first user equipment extracts the communication layer group identifier of the first mobile group from a preset location of the first message.

S404. The first user equipment sends the communication layer group identifier of the first mobile group and group communication data to a group communications server.

S405. After receiving the communication layer group identifier of the first mobile group and the group communication data that are sent by the first user equipment, the group communications server sends the group communication data to second user equipment according to the communication layer group identifier of the first mobile group.

In this embodiment of the present invention, the first user equipment adds only the group identifier of the first mobile group to send the group communication data to be sent by the first user equipment. Therefore, the first mobile group is a primary mobile group of the first user equipment. The base station to which the first user equipment belongs broadcasts the first message including the communication layer group identifier of the first mobile group, and the communication layer group identifier of the first mobile group is placed in the preset location, so that the first user equipment can extract a communication layer identifier of the primary mobile group of the first user equipment, that is, the communication layer identifier of the first mobile group, from the preset location of the first message, and then the first user equipment sends the group communication data in the first mobile group in an uplink manner. Compared with the prior art in which user equipment needs to add application layer identifiers of different mobile groups to send group communication data in an uplink manner for a plurality of times, the group communications method provided in this embodiment of the present invention significantly reduces an uplink resource waste.

Preferably, in this embodiment of the present invention, the first message broadcast by the base station is a system message.

Specifically, a specific process in S405 that the group communications server sends the group communication data to user equipment in the first mobile group other than the first user equipment according to the communication layer group identifier of the first mobile group is similar to S105, S204, and S305 in the foregoing embodiments, and details are not described herein again.

Because the first user equipment adds only the communication layer group identifier of the first mobile group when sending the group communication data, the group communications server sends the group communication data to the user equipment in the first mobile group other than the first user equipment in a downlink manner according to only the communication layer group identifier of the first mobile group, and does not send the group communication data in another cell, thereby reducing a downlink resource waste.

Further, after obtaining the communication layer group identifier of the first mobile group, the first user equipment in this embodiment of the present invention may further obtain an application layer group identifier of the first mobile group from a third preset correspondence according to the communication layer group identifier of the first mobile group, so as to send the application layer group identifier of the first mobile group and the group communication data to the group communications server. In this application scenario, an interaction process between the first user equipment, the base station to which the first user equipment belongs, and the group communications server is similar to that in FIG. 7, and no accompanying drawing is provided again for describing this embodiment of the present invention.

Embodiment 5

Figure 8:
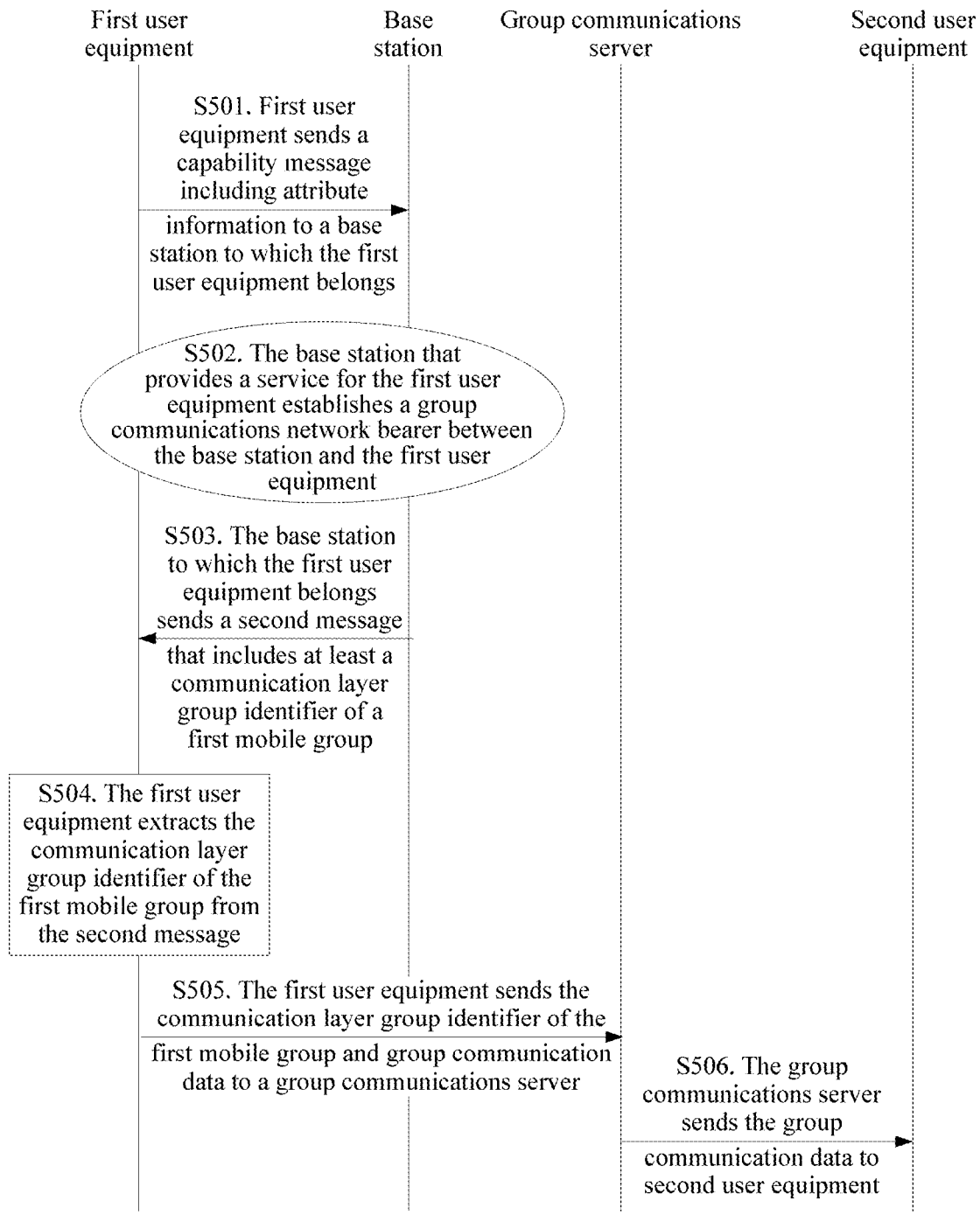
FIG. 8 is a fifth schematic flowchart of a group communications method according to an embodiment of the present invention.

As shown in FIG. 8, another embodiment of the present invention provides a group communications method, including the following operations.

S501. First user equipment sends a capability message including attribute information to a base station to which the first user equipment belongs, where the attribute information is used to indicate that the first user equipment is user equipment on a group communications network.

S502. After receiving the capability message, the base station that provides a service for the first user equipment establishes a group communications network bearer between the base station and the first user equipment according to the attribute information.

S503. The base station that provides a service for the first user equipment sends a second message that includes at least a communication layer group identifier of a first mobile group to the first user equipment.

A group communications server transmits group communication data with the first user equipment in only the first mobile group, and the first user equipment adds only a group identifier of the first mobile group to send the group communication data to be sent by the first user equipment. That is, the first mobile group is a primary mobile group of the first user equipment.

Preferably, in this embodiment of the present invention, the second message is an RRC (Radio Resource Control) message.

S504. The first user equipment extracts the communication layer group identifier of the first mobile group from the second message.

S505. The first user equipment sends the communication layer group identifier of the first mobile group and group communication data to a group communications server.

S506. After receiving the communication layer group identifier of the first mobile group and the group communication data that are sent by the first user equipment, the group communications server sends the group communication data to second user equipment according to the communication layer group identifier of the first mobile group.

S505 and S506 in this embodiment of the present invention are the same as S404 and S405 in the last embodiment, and details are not described herein again.

A difference between this embodiment and the last embodiment is that, in this embodiment of the present invention, the first user equipment first reports the capability message including the attribute information to the base station to which the first user equipment belongs, and the base station to which the first user equipment belongs establishes a network connection to the first user equipment according to the attribute information, and directly sends the communication layer group identifier of the first mobile group to the first user equipment by using the second message, where the second message has a function the same as that of dedicated signaling. In this way, only an information element of the dedicated signaling between the base station to which the first user equipment belongs and the first user equipment needs to be defined.

In the last embodiment, if the first message is a system message, a format of the system message or a layout of content carried in the message needs to be modified. Compared with the last embodiment, in this embodiment of the present invention, the base station to which the first user equipment belongs directly sends the communication layer group identifier of the first mobile group to the first user equipment by using the second message, so that the system message does not need to be modified and implementation is simpler and more convenient.

Embodiment 6

Figure 9:
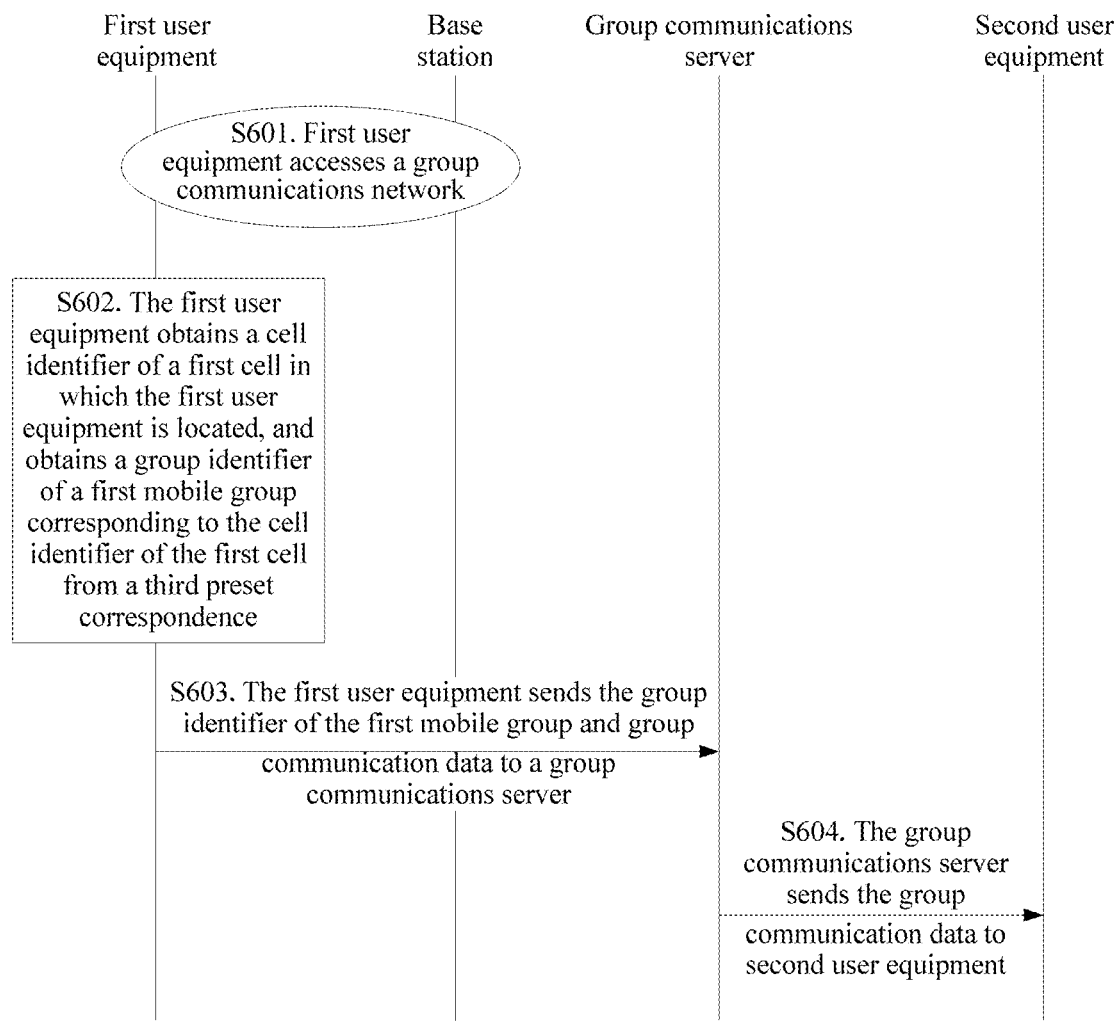
FIG. 9 is a sixth schematic flowchart of a group communications method according to an embodiment of the present invention.

As shown in FIG. 9, still another embodiment of the present invention provides a group communications method, including the following operations.

S601. First user equipment accesses a group communications network.

S602. The first user equipment obtains a cell identifier of a first cell in which the first user equipment is located, and obtains a group identifier of a first mobile group corresponding to the cell identifier of the first cell from a second preset correspondence.

The second preset correspondence stores a cell identifier of at least one cell and a group identifier of a primary mobile group to which each cell of the at least one cell belongs.

S603. The first user equipment sends the group identifier of the first mobile group and group communication data to a group communications server.

S604. After receiving the group identifier of the first mobile group and the group communication data that are sent by the first user equipment, the group communications server sends the group communication data to second user equipment according to the group identifier of the first mobile group.

S601 in this embodiment of the present invention is the same as S401 in the last embodiment, S603 and S604 are the same as S505 and S506 in the last embodiment, and details are not described herein again.

A difference between this embodiment and the foregoing embodiments is that, in this embodiment of the present invention, the first user equipment itself stores the second preset correspondence between a cell identifier of at least one cell and a group identifier of a primary mobile group to which each cell of the at least one cell belongs. In this way, after obtaining the cell identifier of the first cell to which the first user equipment belongs, the first user equipment may obtain the group identifier of the first mobile group corresponding to the cell identifier of the first cell from the second preset correspondence, so as to send the group communication data and the group identifier of the first mobile group to the group communications server.

Similarly, the same as the group identifier of the mobile group in the foregoing embodiments, the group identifier of the mobile group in this embodiment of the present invention may be an application layer group identifier of the mobile group, or a communication layer group identifier of the mobile group, or an area identifier of the mobile group, and details are not described herein again.

Compared with the last embodiment, in this embodiment of the present invention, the user equipment can obtain the communication layer group identifier of the first mobile group without modifying any signaling or system message.

It can be seen from the foregoing embodiments that, no matter in which embodiment, uplink and downlink resource wastes can be reduced by using any of the group communications methods provided in the present invention.

Embodiment 7

Figure 10:
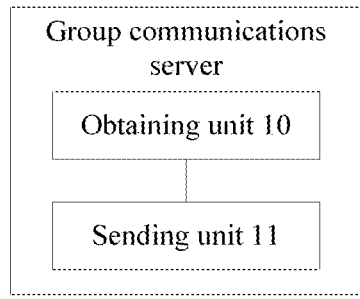
FIG. 10 is a first schematic structural diagram of a group communications server according to an embodiment of the present invention.

This embodiment of the present invention provides a group communications server. The group communications server is configured to execute operations executed by the group communications server in the foregoing methods. The group communications server may include modules corresponding to corresponding operations. For example, as shown in FIG. 10, the group communications server may include:

an obtaining unit 10, configured to obtain group communication data to be sent by first user equipment and a cell identifier of a first cell, where the first cell provides a service for the first user equipment, and configured to obtain, according to the cell identifier of the first cell, a group identifier of a first mobile group corresponding to the cell identifier of the first cell from a first preset correspondence, where the first preset correspondence stores the cell identifier of the first cell and the group identifier of the first mobile group; and a sending unit 11, configured to send the group communication data to user equipment in the first mobile group other than the first user equipment according to the group identifier that is of the first mobile group and that is obtained by the obtaining unit 10.

Further, the obtaining unit 10 is configured to receive and parse first group communication information sent by the first user equipment or a base station, where the first group communication information includes the group communication data and the cell identifier of the first cell, and the base station provides a service for the first user equipment.

The group identifier of the first mobile group is a communication layer group identifier of the first mobile group, an application layer group identifier of the first mobile group, or an area identifier of the first mobile group.

It should be understood that the group communications server in this embodiment may be corresponding to the group communications server in the group communications method in any one of the embodiments in FIG. 4 to FIG. 9, and division and/or functions of various modules in the group communications server in this embodiment are used for implementing the process of the method shown in any one of FIG. 4 to FIG. 9. For simplicity, details are not described herein again.

The group communications server provided in this embodiment of the present invention mainly includes an obtaining unit and a sending unit. After obtaining the group communication data to be sent by the first user equipment and the cell identifier of the first cell, the group communications server obtains, according to the first preset correspondence and the cell identifier of the first cell, a set of cells to which the group communications server sends, in a downlink manner, the group communication data obtained by the group communications server, that is, obtains the group identifier of the first mobile group. In this way, the group communications server sends, to the user equipment in the first mobile group other than the first user equipment, the group communication data obtained by the group communications server, thereby reducing a waste of a resource used by the group communications server for sending the group communication data in a downlink manner. Correspondingly, the first user equipment arbitrarily selects a mobile group from mobile groups to which the first user equipment belongs, to send the group communication data in an uplink manner, so that the group communications server obtains the group communication data, thereby reducing an uplink resource waste.

Embodiment 8

Figure 11:
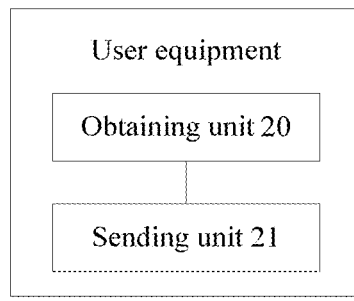
FIG. 11 is a first schematic structural diagram of user equipment according to an embodiment of the present invention.

This embodiment of the present invention provides user equipment. The user equipment is configured to execute operations executed by the first user equipment in the foregoing methods. The user equipment may include modules corresponding to corresponding operations. The user equipment is the foregoing first user equipment. For example, as shown in FIG. 11, the user equipment may include:

an obtaining unit 20, configured to obtain a first identifier, where the first identifier is a cell identifier of a first cell or a group identifier of a first mobile group, the first cell serves the user equipment, and the group communications server transmits group communication data with the user equipment in only the first mobile group; and a sending unit 21, configured to send the first identifier obtained by the obtaining unit 20 and to-be-sent group communication data to the group communications server.

Further, the obtaining unit 20 is configured to:

obtain the cell identifier of the first cell in which the user equipment is located; and obtain, according to the cell identifier of the first cell, the group identifier of the first mobile group corresponding to the cell identifier of the first cell from a second preset correspondence, where the second preset correspondence stores the cell identifier of the first cell and the group identifier of the first mobile group.

The group identifier of the first mobile group is a communication layer group identifier of the first mobile group, an application layer group identifier of the first mobile group, or an area identifier of the first mobile group.

Further, the group identifier of the first mobile group is the application layer group identifier of the first mobile group; and the obtaining unit 20 is configured to:

obtain the communication layer group identifier of the first mobile group; and obtain, according to the communication layer group identifier of the first mobile group, the application layer group identifier of the first mobile group corresponding to the communication layer group identifier of the first mobile group from a third preset correspondence, where the third preset correspondence stores the communication layer group identifier of the first mobile group and the application layer group identifier of the first mobile group.

Figure 12:
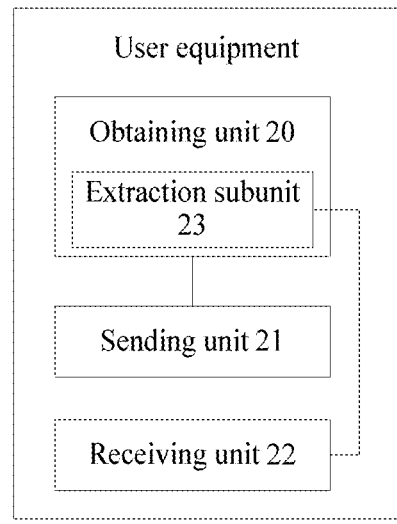
FIG. 12 is a second schematic structural diagram of user equipment according to an embodiment of the present invention.

Further, as shown in FIG. 12, the group identifier of the first mobile group is the application layer group identifier of the first mobile group, and the user equipment further includes a receiving unit 22.

The receiving unit 22 is configured to receive a first message broadcast by a base station, where the first message includes communication layer group identifiers of at least two mobile groups, the first mobile group is one of the at least two mobile groups, the communication layer group identifier of the first mobile group is placed in a preset location of the first message, and the base station provides a service for the user equipment.

Further, as shown in FIG. 12, the obtaining unit 20 includes an extraction subunit 23.

The extraction subunit 23 is configured to extract the communication layer group identifier of the first mobile group from the preset location of the first message received by the receiving unit 22.

Further, the group identifier of the first mobile group is the application layer group identifier of the first mobile group; and the sending unit 21 is configured to send a capability message to a base station, where the capability message includes at least attribute information, the attribute information is used to indicate that the user equipment is user equipment on a group communications network, and the base station provides a service for the user equipment.

Further, the receiving unit 22 is configured to receive a second message sent by the base station, where the second message includes at least the communication layer group identifier of the first mobile group.

Further, the extraction subunit 23 is configured to extract the communication layer group identifier of the first mobile group from the second message received by the receiving unit 22.

It should be understood that the user equipment in this embodiment may be corresponding to the first user equipment in the group communications method in any one of the embodiments in FIG. 4 to FIG. 9, and division and/or functions of various modules in the user equipment in this embodiment are used for implementing the process of the method shown in any one of FIG. 4 to FIG. 9. For simplicity, details are not described herein again.

The user equipment provided in this embodiment of the present invention mainly includes an obtaining unit and a sending unit. When sending the to-be-sent group communication data to the group communications server, the user equipment also adds the cell identifier of the first cell or the group identifier of the first mobile group. The first cell is a cell that provides a service for the user equipment, and the group communications server transmits the group communication data with the user equipment in only the first mobile group. Therefore, the user equipment adds only the first identifier to send the to-be-sent group communication data, and no longer adds a group identifier of another mobile group to send the to-be-sent group communication data, thereby reducing an uplink resource waste. In addition, after receiving the group communication data and the first identifier that are sent by the first user equipment, the group communications server can determine, according to the first identifier, user equipment to which the group communication data is sent in a downlink manner, thereby reducing a downlink resource waste.

Embodiment 9

Figure 13:
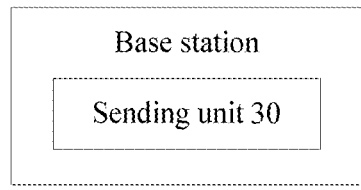
FIG. 13 is a first schematic structural diagram of a base station according to an embodiment of the present invention.

This embodiment of the present invention provides a base station. The base station is configured to execute operations executed by the base station in the foregoing methods. The base station may include modules corresponding to corresponding operations. For example, as shown in FIG. 13, the base station may include:

a sending unit 30, configured to send a communication layer group identifier of a first mobile group to first user equipment, where a group communications server transmits group communication data with the first user equipment in only the first mobile group, and the base station provides a service for the first user equipment.

Further, the sending unit 30 is configured to broadcast a first message, where the first message includes communication layer group identifiers of at least two mobile groups, the first mobile group is one of the at least two mobile groups, and the communication layer group identifier of the first mobile group is placed in a preset location of the first message.

Figure 14:
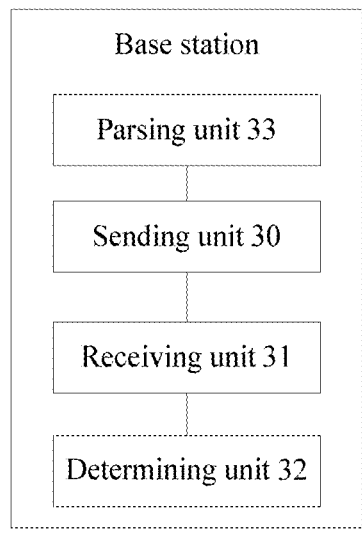
FIG. 14 is a second schematic structural diagram of a base station according to an embodiment of the present invention.

Further, as shown in FIG. 14, the base station further includes a receiving unit 31.

The receiving unit 31 is configured to receive a capability message sent by the first user equipment, where the capability message includes at least attribute information, and the attribute information is used to indicate that the first user equipment is user equipment on a group communications network.

Further, as shown in FIG. 14, the base station further includes a determining unit 32.

The determining unit 32 is configured to determine the communication layer group identifier of the first mobile group according to the attribute information received by the receiving unit 31.

Further, the sending unit 30 is configured to send a second message to the first user equipment, where the second message includes at least the communication layer group identifier that is of the first mobile group and that is determined by the determining unit 32.

Further, as shown in FIG. 14, the base station further includes a parsing unit 33.

The parsing unit 33 is configured to parse second group communication information sent by the first user equipment, where the second group communication information includes a group communication service identifier and group communication data to be sent by the first user equipment, the group communication service identifier is used to represent that a network on which the first user equipment is located is a group communications network, and the base station provides a service for the first user equipment.

Further, the sending unit 30 is configured to send a cell identifier of a first cell to which the first user equipment belongs and the second group communication information to the group communications server according to the group communication service identifier obtained by the parsing unit 33.

It should be understood that the base station in this embodiment may be corresponding to the base station in the group communications method in any one of the embodiments in FIG. 4 to FIG. 9, and division and/or functions of various modules in the base station in this embodiment are used for implementing the process of the method shown in any one of FIG. 4 to FIG. 9. For simplicity, details are not described herein again.

According to the base station provided in this embodiment of the present invention, the base station sends the communication layer group identifier of the first mobile group to the first user equipment, so that when sending the to-be-sent group communication data to the group communications server, the first user equipment adds only the group identifier of the first mobile group, and no longer adds a group identifier of another mobile group to send the to-be-sent group communication data, thereby reducing an uplink resource waste. In addition, after receiving the group communication data and a first identifier that are sent by the first user equipment, the group communications server can determine, according to the first identifier, the first user equipment to which the group communication data is sent in a downlink manner, thereby reducing a downlink resource waste. Alternatively, the base station sends, to the group communications server, the cell identifier of the first cell to which the first user equipment belongs and the second group communication information sent by the first user equipment, so that a processing overhead when the first user equipment adds the cell identifier of the first cell when sending the group communication data to the group communications server is reduced.

Embodiment 10

Figure 15:
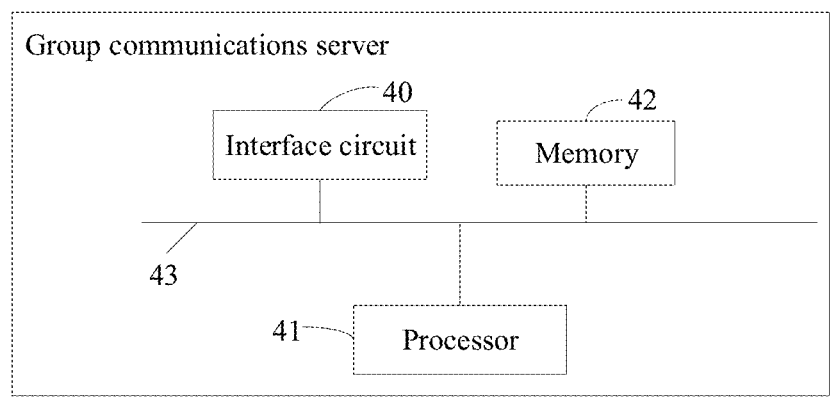
FIG. 15 is a second schematic structural diagram of a group communications server according to an embodiment of the present invention.

This embodiment of the present invention provides a group communications server. As shown in FIG. 15, the group communications server includes an interface circuit 40, a processor 41, a memory 42, and a system bus 43.

The interface circuit 40, the processor 41, and the memory 42 are connected and communicate with each other by using the system bus 43.

The memory 42 is configured to store a first preset correspondence and a third preset correspondence. The first preset correspondence stores a cell identifier of at least one cell and a group identifier of a primary mobile group to which each cell of the at least one cell belongs. A mobile group to which each cell belongs is a mobile group in which the group communications server communicates with user equipment in the cell, and the user equipment in the cell adds only a mobile group identifier of a primary mobile group to send data, but does not add a group identifier of another mobile group. A cell identifier of a first cell is one of the cell identifier of the at least one cell. The third preset correspondence stores a communication layer group identifier of at least one mobile group and an application layer group identifier of each mobile group of the at least one mobile group.

When the group communications server is running, the group communications server executes the group communications method in any one of the embodiments in FIG. 4 to FIG. 9. For a specific group communications method, refer to related description in the embodiment shown in any one of FIG. 4 to FIG. 9, and details are not described herein again.

Optionally, the group communications server in this embodiment of the present invention may be a GCS AS in an LTE system, or a V2V application server in a V2V communications system. This is not specifically limited in this embodiment of the present invention.

Specifically, the processor 41 may be a CPU (Central Processing Unit). The processor 41 may be further another general processor, a DSP (Digital Signal Processing) or another programmable logic device or transistor logic device, a discrete hardware component, or the like. The general processor may be a microprocessor, or the processor may be any conventional processor or the like.

The processor 41 may be a dedicated processor. The dedicated processor may include at least one of a baseband processing chip, a radio frequency processing chip, or the like. Further, the dedicated processor may further include a chip having another dedicated processing function of the group communications server.

Specifically, the memory 42 may be a volatile memory, such as a RAM (Random-access Memory). The memory 42 may also be a non-volatile memory, such as a ROM (Read-only Memory), a flash memory, an HDD (Hard Disk Drive), or an SSD (Solid-State Drive). The memory 42 may be further a combination of memories of the foregoing types.

The system bus 43 may include a data bus, a power bus, a control bus, and a signal status bus. In this embodiment, for clear description, various types of buses in FIG. 15 are marked as the system bus 43.

According to the group communications server provided in this embodiment of the present invention, after obtaining group communication data to be sent by first user equipment and the cell identifier of the first cell, the group communications server obtains, according to the first preset correspondence and the cell identifier of the first cell, a set of cells to which the group communications server sends, in a downlink manner, the group communication data obtained by the group communications server, that is, obtains a group identifier of a first mobile group. In this way, the group communications server sends, to user equipment in the first mobile group other than the first user equipment, the group communication data obtained by the group communications server, thereby reducing a waste of a resource used by the group communications server for sending the group communication data in a downlink manner. Correspondingly, the first user equipment arbitrarily selects a mobile group from mobile groups to which the first user equipment belongs, to send the group communication data in an uplink manner, so that the group communications server obtains the group communication data, thereby reducing an uplink resource waste.

Embodiment 11

Figure 16:
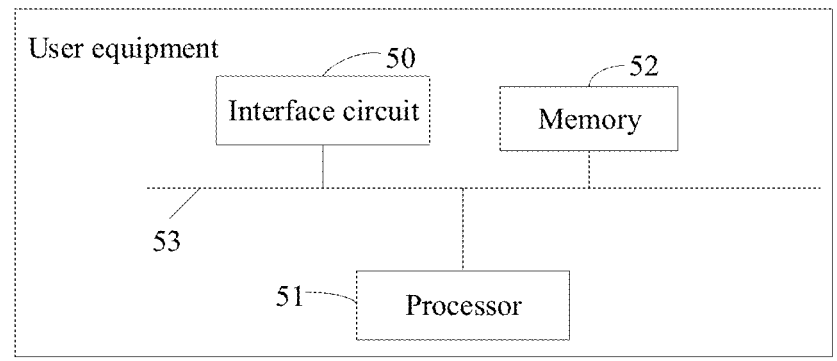
FIG. 16 is a third schematic structural diagram of user equipment according to an embodiment of the present invention.

This embodiment of the present invention provides user equipment. As shown in FIG. 16, the user equipment includes an interface circuit 50, a processor 51, a memory 52, and a system bus 53.

The interface circuit 50, the processor 51, and the memory 52 are connected and communicate with each other by using the system bus 53.

The memory 52 is configured to store a computer executable instruction and a second preset correspondence. The second preset correspondence stores a cell identifier of at least one cell and a group identifier of a primary mobile group to which each cell of the at least one cell belongs.

When the user equipment is running, the user equipment executes the group communications method in any one of the embodiments in FIG. 4 to FIG. 9. For a specific group communications method, refer to related description in the embodiment shown in any one of FIG. 4 to FIG. 9, and details are not described herein again.

Specifically, the processor 51 may be a CPU, and may be further another general processor, a DSP or another programmable logic device or transistor logic device, a discrete hardware component, or the like. The general processor may be a microprocessor, or the processor may be any conventional processor or the like.

The processor 51 may be a dedicated processor. The dedicated processor may include at least one of a baseband processing chip, a radio frequency processing chip, or the like. Further, the dedicated processor may further include a chip having another dedicated processing function of a group communications server.

Specifically, the memory 52 may be a volatile memory, such as a RAM. The memory 52 may also be a non-volatile memory, such as a ROM, a flash memory, an HDD, or an SSD. The memory 52 may be further a combination of memories of the foregoing types.

The system bus 53 may include a data bus, a power bus, a control bus, and a signal status bus. In this embodiment, for clear description, various types of buses in FIG. 16 are marked as the system bus 53.

According to the user equipment provided in this embodiment of the present invention, when sending to-be-sent group communication data to a group communications server, the user equipment also adds a cell identifier of a first cell or a group identifier of a first mobile group. The first cell is a cell that provides a service for the user equipment, and the group communications server transmits group communication data with the user equipment in only the first mobile group. Therefore, the user equipment adds only a first identifier to send the to-be-sent group communication data, and no longer adds a group identifier of another mobile group to send the to-be-sent group communication data, thereby reducing an uplink resource waste. In addition, after receiving the group communication data and the first identifier that are sent by the first user equipment, the group communications server can determine, according to the first identifier, user equipment to which the group communication data is sent in a downlink manner, thereby reducing a downlink resource waste.

Embodiment 12

Figure 17:
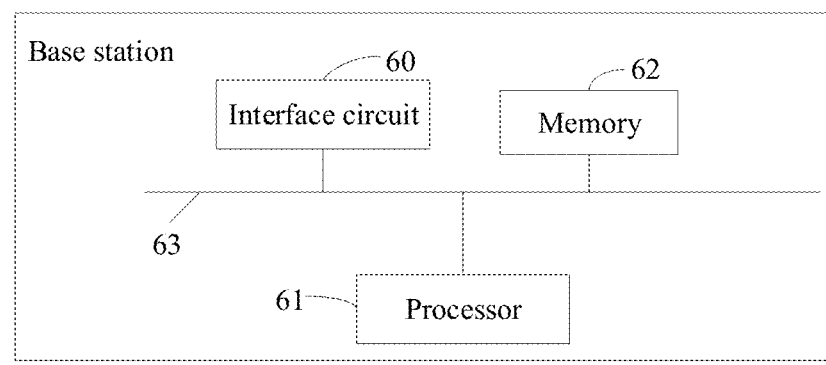
FIG. 17 is a third schematic structural diagram of a base station according to an embodiment of the present invention.

This embodiment of the present invention provides a base station. As shown in FIG. 17, the base station includes an interface circuit 60, a processor 61, a memory 62, and a system bus 63.

The interface circuit 60, the processor 61, and the memory 62 are connected and communicate with each other by using the system bus 63.

When the base station is running, the base station executes the group communications method in any one of the embodiments in FIG. 4 to FIG. 9. For a specific group communications method, refer to related description in the embodiment shown in any one of FIG. 4 to FIG. 9, and details are not described herein again.

Specifically, the processor 61 may be a CPU, and may be further another general processor, a DSP or another programmable logic device or transistor logic device, a discrete hardware component, or the like. The general processor may be a microprocessor, or the processor may be any conventional processor or the like.

The processor 61 may be a dedicated processor. The dedicated processor may include at least one of a baseband processing chip, a radio frequency processing chip, or the like. Further, the dedicated processor may further include a chip having another dedicated processing function of a group communications server.

Specifically, the memory 62 may be a volatile memory, such as a RAM. The memory 62 may also be a non-volatile memory, such as a ROM, a flash memory, an HDD, or an SSD. The memory 62 may be further a combination of memories of the foregoing types.

The system bus 63 may include a data bus, a power bus, a control bus, and a signal status bus. In this embodiment, for clear description, various types of buses in FIG. 16 are marked as the system bus 63.

According to the base station provided in this embodiment of the present invention, the base station sends a communication layer group identifier of a first mobile group to first user equipment, so that when sending to-be-sent group communication data to a group communications server, the first user equipment adds only a group identifier of the first mobile group, and no longer adds a group identifier of another mobile group to send the to-be-sent group communication data, thereby reducing an uplink resource waste. In addition, after receiving the group communication data and a first identifier that are sent by the first user equipment, the group communications server can determine, according to the first identifier, the first user equipment to which the group communication data is sent in a downlink manner, thereby reducing a downlink resource waste. Alternatively, the base station sends, to the group communications server, a cell identifier of a first cell to which the first user equipment belongs and second group communication information sent by the first user equipment, so that a processing overhead when the first user equipment adds the cell identifier of the first cell when sending the group communication data to the group communications server is reduced.

Embodiment 13

Figure 18:
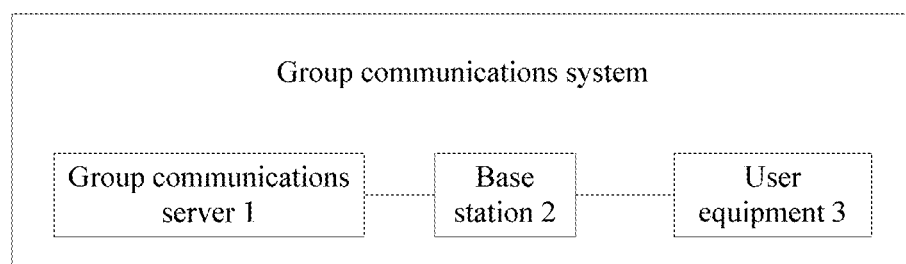
FIG. 18 is a schematic structural diagram of a group communications system according to an embodiment of the present invention.

As shown in FIG. 18, this embodiment of the present invention provides a group communications system, including a group communications server 1, at least two base stations 2, and at least two user equipments 3 connected to each base station 2.

In the group communications system provided in this embodiment of the present invention, the group communications server 1, the base station 2, and the user equipment 3 separately implement the group communications methods in the embodiments of the present invention by executing corresponding operations in processes of the group communications method in any one of the embodiments in FIG. 4 to FIG. 9.

It may be clearly understood by a person of ordinary skill in the art that, for the purpose of convenient and brief description, division of the foregoing function modules is taken as an example for illustration. In actual application, the foregoing functions can be allocated to different function modules and implemented according to a requirement, that is, an inner structure of a mobile device is divided into different function modules to implement all or a part of the functions described above. For a detailed working process of the foregoing system, mobile device, and unit, refer to a corresponding process in the foregoing method embodiments, and details are not described herein again.

In the several embodiments provided in this application, it should be understood that the disclosed system, mobile device, and method may be implemented in other manners. For example, the described mobile device embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the mobile device or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) or a processor to perform all or a part of the operations of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The descriptions are only specific implementations of the present invention, but are not intended to limit the protection scope of embodiments of the present invention. Any variation or replacement readily figured out by a person of ordinary skill in the art within the technical scope disclosed in the present disclosure shall fall within the protection scope of the embodiments of the present invention. Therefore, the protection scope of the embodiments of the present invention shall be subject to the protection scope of the claims.

What is claimed is:

1. A group communications method, comprising:
obtaining, by a group communications server, group communication data to be sent by a first user equipment and a cell identifier of a first cell, wherein the first cell provides a service for the first user equipment;
obtaining, by the group communications server, a group identifier of a first mobile group based on the cell identifier of the first cell using a first preset correspondence stored in a memory, wherein the first preset correspondence is a correspondence between the cell identifier of the first cell and the group identifier of the first mobile group, wherein the group identifier of the first mobile group is a communication layer group identifier that is a temporary mobile group identity of the first mobile group; and
sending, by the group communications server, the group communication data to a second user equipment in the first mobile group other than the first user equipment according to the group identifier of the first mobile group.

2. The group communications method according to claim 1, wherein the obtaining, by the group communications server, the group communication data to be sent by the first user equipment and the cell identifier of the first cell serving the first user equipment comprises:
receiving and parsing, by the group communications server, a first group communication information sent by one of the first user equipment and a base station, wherein the first group communication information comprises the group communication data and the cell identifier of the first cell, and wherein the base station provides a service for the first user equipment.

3. A group communications method, comprising:
obtaining, by a first user equipment, a first identifier, wherein the first identifier is a cell identifier of a first cell and wherein the first user equipment is configured to obtain a group identifier of a first mobile group using a second preset correspondence stored in a memory, wherein the second preset correspondence is a correspondence, between the cell identifier of the first cell and the group identifier of the first mobile group, wherein the group identifier of the first mobile group is a communication layer group identifier that is a temporary mobile group identity of the first mobile group; and
sending, by the first user equipment, the group identifier of the first mobile group and communication data to a group communications server to transmit to a second user equipment based on the group identifier of the first mobile group.

4. The group communications method according to claim 3, wherein
the first cell is a cell in which the first user equipment is located.

5. The group communications method according to claim 3, further comprising:
obtaining, by the first user equipment according to the communication layer group identifier of the first mobile group, the application layer group identifier of the first mobile group corresponding to the communication layer group identifier of the first mobile group using a third preset correspondence stored in the memory, wherein the third preset correspondence is a correspondence between the communication layer group identifier of the first mobile group and the application layer group identifier of the first mobile group.

6. A group communications server, comprising:
an obtaining unit configured to obtain group communication data to be sent by a first user equipment and a cell identifier of a first cell, wherein the first cell provides a service for the first user equipment, and wherein the obtaining unit is configured to obtain, according to the cell identifier of the first cell, a group identifier of a first mobile group based on the cell identifier of the first cell using a first preset correspondence stored in a memory, wherein the first preset correspondence is a correspondence between the cell identifier of the first cell and the group identifier of the first mobile group, wherein the group identifier of the first mobile group is a communication layer group identifier that is a temporary mobile group identity of the first mobile group; and
a sending unit configured to send the group communication data to a second user equipment in the first mobile group other than the first user equipment according to the group identifier of the first mobile group that is obtained by the obtaining unit.

7. The group communications server according to claim 6, wherein
the obtaining unit is configured to receive and parse a first group communication information sent by one of the first user equipment and a base station, wherein the first group communication information comprises the group communication data and the cell identifier of the first cell, and wherein the base station provides a service for the first user equipment.

8. A user equipment, comprising:
an obtaining unit configured to obtain a first identifier, wherein the first identifier is a cell identifier of a first cell, wherein the first user equipment is configured to obtain a group identifier of a first mobile group using a second preset correspondence stored in a memory, wherein the second preset correspondence is a correspondence between the cell identifier of the first cell and the group identifier of the first mobile group, wherein the group identifier of the first mobile group is a communication layer group identifier that is a temporary mobile group identity of the first mobile group, wherein the first cell serves the user equipment, and wherein the group communications server transmits group communication data with the user equipment in the first mobile group; and
a sending unit configured to send the group identifier of the first mobile group obtained by the obtaining unit and the group communication data to the group communications server.

9. The user equipment according to claim 8, wherein
the first cell is a cell in which the user equipment is located.

10. The user equipment according to claim 8, wherein the obtaining unit is further configured to:
obtain, according to the communication layer group identifier of the first mobile group, the application layer group identifier of the first mobile group corresponding to the communication layer group identifier of the first mobile group using a third preset correspondence stored in the memory, wherein the third preset correspondence is a correspondence between the communication layer group identifier of the first mobile group and the application layer group identifier of the first mobile group.

* * * * *